US006414580B1

(12) United States Patent
Sato et al.

(10) Patent No.: US 6,414,580 B1
(45) Date of Patent: Jul. 2, 2002

(54) ELECTRICAL NOISE SUPPRESSING DEVICE FOR MOTORS

(75) Inventors: Toshihiro Sato; Shuuichi Gonda, both of Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 46 days.

(21) Appl. No.: 09/722,304

(22) Filed: Nov. 28, 2000

(30) Foreign Application Priority Data

Jan. 25, 2000 (JP) ....................................... 2000-016075
Oct. 16, 2000 (JP) ....................................... 2000-315556

(51) Int. Cl.[7] .......................... H01F 27/29; H01F 27/02
(52) U.S. Cl. ............................ 336/192; 336/92; 310/51
(58) Field of Search .......................... 336/192, 92, 174, 336/175; 310/51, 71, 68 R

(56) References Cited

U.S. PATENT DOCUMENTS 4,845,393 A 7/1989 Burgess et al.
5,231,321 A * 7/1993 Takiguchi .................... 310/51
5,313,126 A * 5/1994 Forsythe et al. .............. 310/51
5,554,010 A 9/1996 Schoedl et al.
5,734,212 A 3/1998 Uffelman
5,942,819 A * 8/1999 Burgess et al. ............... 310/51
6,104,110 A * 8/2000 Uchida et al. ................ 310/51

FOREIGN PATENT DOCUMENTS

DE 19856390 A1 6/2000
GB 2298524 A 9/1996
JP 3-86052 4/1991

* cited by examiner

*Primary Examiner*—Anh Mai
(74) *Attorney, Agent, or Firm*—Law Offices of David G. Posz

(57) ABSTRACT

An electrical noise suppressing device has a pair of parallel first connecting terminals connectable to terminals of a motor and a pair of parallel second connecting terminals connectable to an external power source. The first connecting terminals and the second connecting terminals are raised on opposite surfaces of an insulating plate, respectively, at the same position of the insulating plate. A pair of choke coils and a capacitor are disposed between and connected to the second connecting terminals to suppress electrical noise.

17 Claims, 4 Drawing Sheets

ELECTRICAL NOISE SUPPRESSING DEVICE FOR MOTORS

CROSS REFERENCE TO RELATED APPLICATION,

This application is based on and incorporates herein by reference Japanese Patent Application Nos. 2000-16075 filed Jan. 25, 2000 and 2000-315556 filed Oct. 16, 2000.

BACKGROUND OF THE INVENTION

1. Field of the Invention

This invention relates to an electrical noise suppressing device for motors.

2. Related Art

Direct current electrical motors generate electrical noises due to sliding contact between brushes and commutators. The noise will influence electronic devices disposed around the motor. Electrical component parts such as choke coils and capacitors are provided in the motor, specifically between the brushes and power supply terminals which are connectable with an external electrical power source, to suppress generation of electrical noise. Motors are designed to have a structure for supporting the noise suppressing component parts therein so that those noise suppressing component parts may be mounted and supported thereby as the case may be. As a result, the supporting structure for the noise suppressing component parts requires more space in the motor, but may become useless in some motors which do not need such component parts.

SUMMARY OF THE INVENTION

It is therefore an object of the present invention to provide an electrical noise suppressing device for motors which requires less mounting space and less cost.

According to the present invention, an electrical noise suppressing device for a motor is constructed to be attachable to a motor which has a pair of motor-side connecting terminals connectable to a pair of source-side connecting terminals of an electrical power source. The noise suppressing device has a casing having a shape attachable to the motor at a side of the motor-side connecting terminals. A pair of connecting terminals are fixedly disposed in the casing and connectable with the motor-side connecting terminals and the source-side connecting terminals. Electrical noise suppressing components are disposed in the casing and connected to the connecting terminals of the casing for suppressing electrical noise generated in the motor. Preferably, the noise suppressing components have a longitudinal shape and is disposed in such a manner that its longitudinal direction is perpendicular to a direction in which the connecting terminals of the casing face each other.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
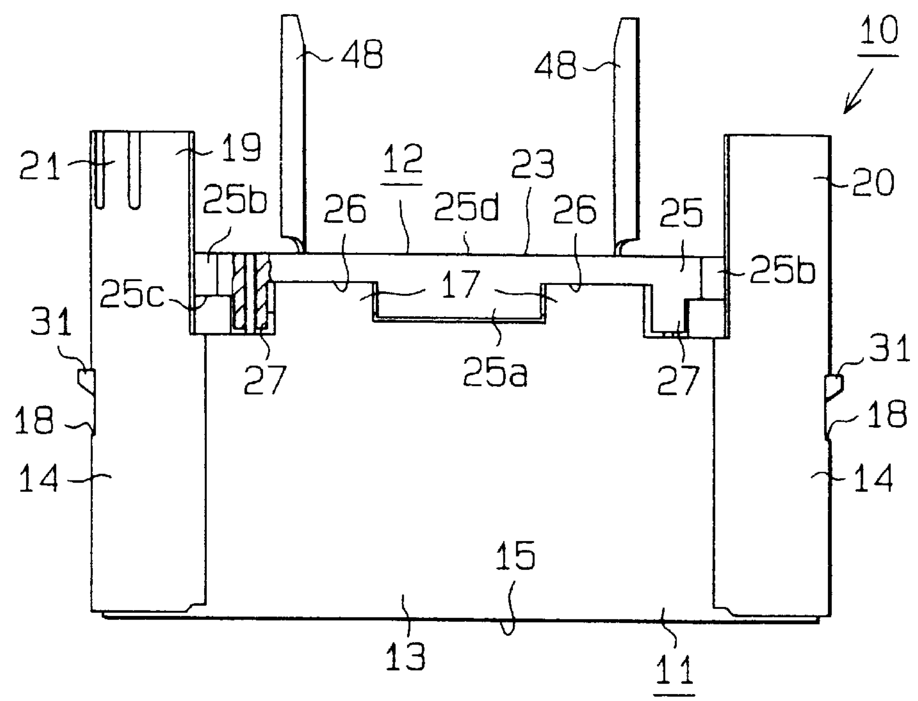
FIG. 1 is a front view showing, partly in section, an electrical noise suppressing device according to an embodiment of the present invention.
Figure 2:
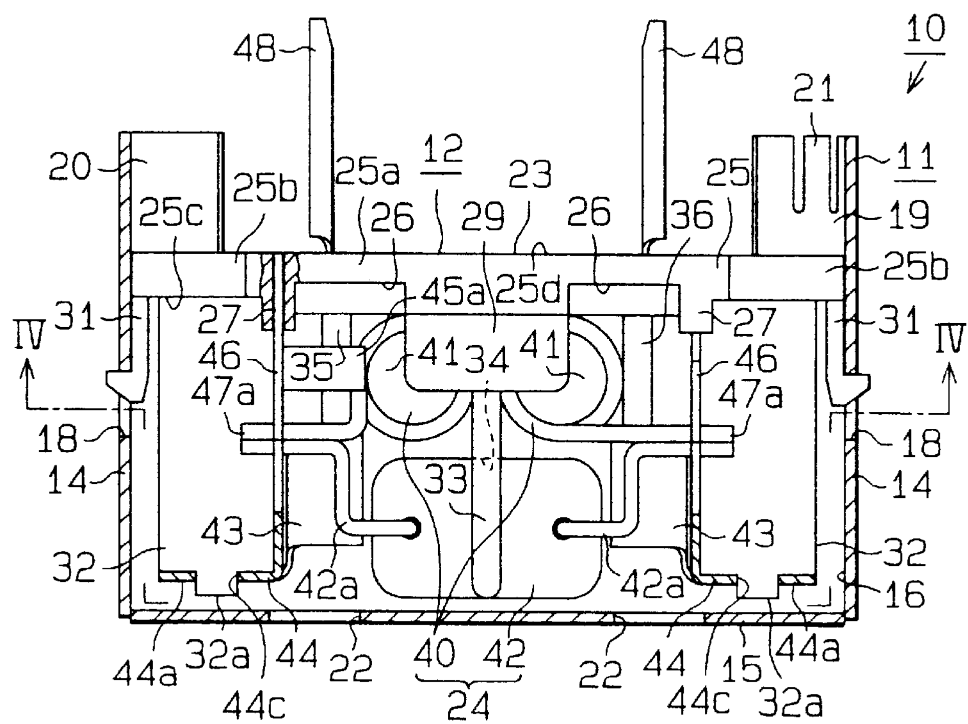
FIG. 2 is a front sectional view of the electrical noise suppressing device shown in FIG. 1.

Referring first to FIGS. 1 and 2, an electrical noise suppressing device 10 comprises a casing 11 and a noise suppressor 12. The casing 11 is made of an electrically conductive iron plate and formed in generally a bottomed flat cylindrical shape. As shown in FIGS. 1 to 4, the casing 11 has an accommodating chamber 16 defined by a pair of parallel side walls 13, a pair of arcuate side walls 14 and a bottom wall 15. Each parallel side wall 13 is formed with two engagement protrusions 17 on its top end, and each arcuate side wall 14 is formed with an engagement hole 18 in its central position. The arcuate side walls 14 are formed with guides 19 and 20, respectively, which extend above the parallel side walls 13. Each guide 19, 20 has a plurality of bendable tongues 21. The bottom wall 15 has through holes 22.

Figure 4:
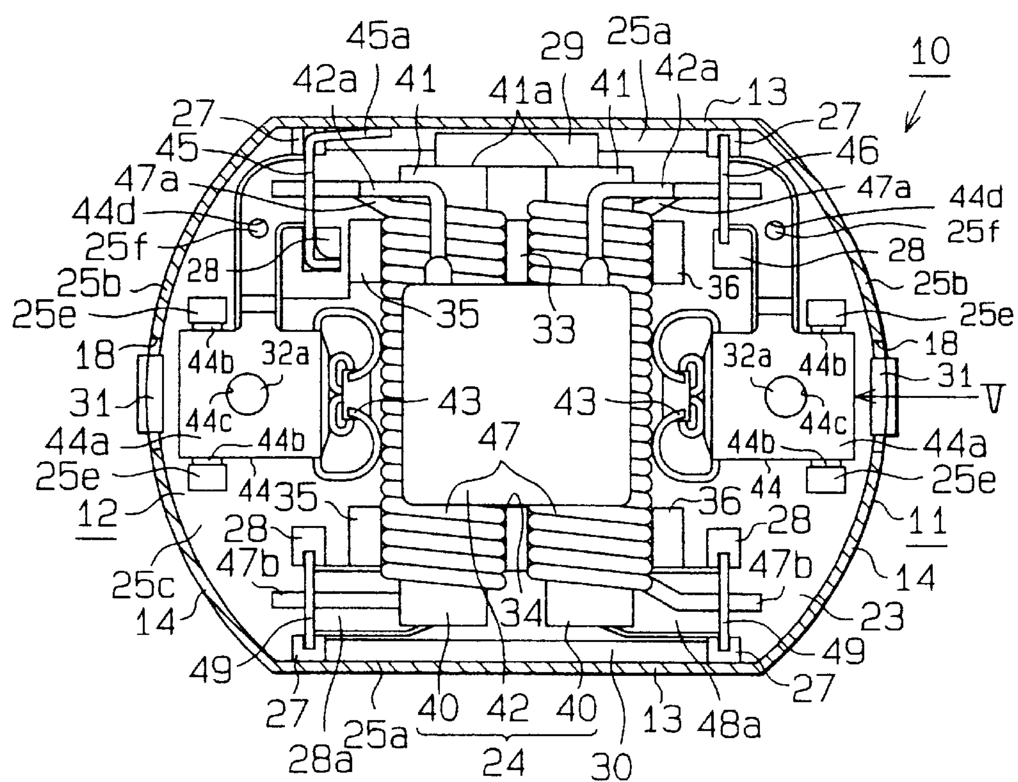
FIG. 4 is a sectional view of the electrical noise suppressing device taken along a line IV—IV in FIG. 2.

The electrical noise suppressor 12 has an electrical component part holding block 23 and electrical component parts 24 supported by the holding block 23. The holding block 23 is made of a resin material and has an insulating plate 25 shaped in correspondence with a transverse plane of the accommodating chamber 16 of the casing 11. That is, the plate 25 has a pair of parallel parts 25*a* and a pair of arcuate parts 25*b*. The plate 25 is formed with two engagement recesses 26 on a bottom surface 25*c* which is at both sides of the parallel parts 25*a*. The engagement recesses 26 are shaped in correspondence with the engagement protrusions 17 of the parallel side walls 13 of the casing 11. First posts 27 are formed to extend from the bottom surface 25*c* at both sides of the engagement recesses 26. Second posts 28 are formed on the bottom surface 25*c* of the plate 25 as shown in FIG. 4. The second posts 28 are spaced apart from the first posts 27. A holding plate 29 is formed on the bottom surface 25*c* to extend in a downward direction at the parallel part 25*a* of one side (front side in FIG. 2) of the plate 25. A holding plate 30 is formed on the bottom surface 25*c* at the parallel part 25*a* at the other side of the plate 25 to connect first posts 27.

As shown in FIG. 2, an engagement protrusion 31 is formed to extend in the downward direction from the bottom surface 25*c* at the central part of each arcuate part 25*b* of the plate 25. The engagement protrusion 31 has a nail at its top end. As shown in FIGS. 2 and 4, supporting body 32 is formed to extend from the bottom surface 25*c* at the inside of each arcuate part 25*b*. Further, a wall 33 is formed to extend from the bottom surface 25*c* at the central position between the arcuate parts 25*b*. The wall 33 is formed with a recess 34 in the center as shown in FIG. 4. Third and fourth posts 35 and 36 are formed to extend from the bottom surface 25*c* at positions spaced apart from the both ends of the wall 33. The posts 35 and 36 are located at symmetric positions with respect to the wall 33.

As shown in FIGS. 2 and 4, a pair of cylindrically-shaped choke coils 40 are fitted between the wall 33 and the third posts 35 and between the wall 33 and the fourth posts 36, respectively. Each choke coil 40 is supported in such a manner that its longitudinal (axial) direction is perpendicular to a direction in which a pair of female terminals faces each other and is parallel with the bottom surface 25*c*. The choke coils 40 are separated by the wall 33. One end 41*a* of a core 41 is held in abutment with the holding plate 29.

A capacitor 42 of generally a square pole shape is fitted in the recess 34 of the wall 33. The capacitor 42 is positioned in parallel with the bottom surface 25*c* between the female terminals 43. The longitudinal direction of the capacitor 42 is perpendicular to the direction in which the female terminals 43 face each other.

Each female terminal 43 is formed as a second connecting terminal at a base end of a connector piece 44. Each connector piece 44 is disposed at a predetermined location including the supporting body 32 at the underside of the bottom surface 25*c*. The female terminal 43 extends in a direction perpendicular to the bottom surface 25*c*.

Figure 5:
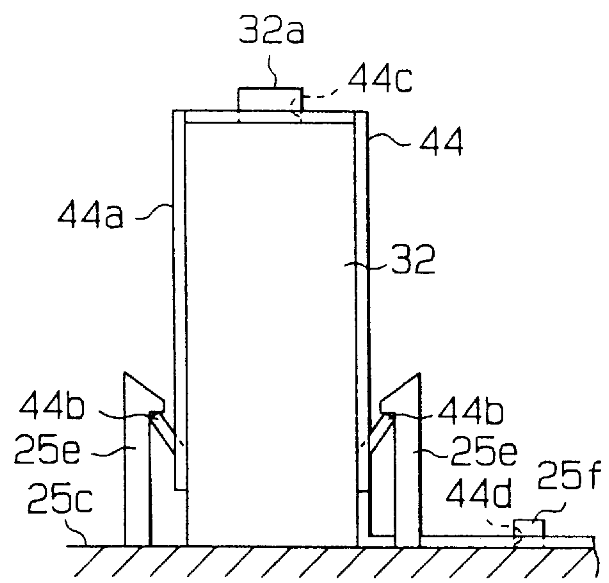
FIG. 5 is a side view of the electrical noise suppressing device taken in a direction V in FIG. 4.
Figure 6:
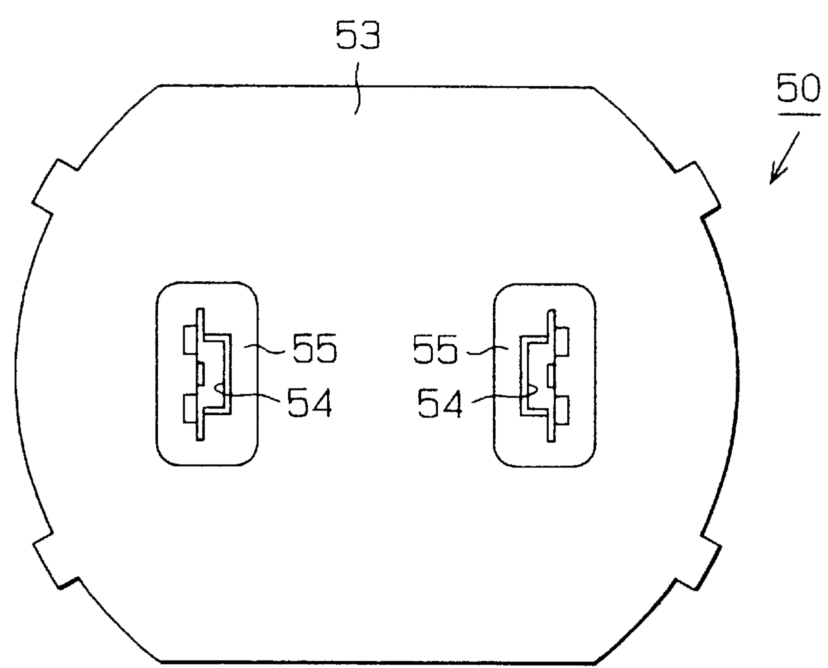
FIG. 6 is a plan view showing a motor with which the electrical noise suppressing device is assembled.

The connector piece 44 has a fitting surface 44*a* with which the supporting body 32 is force-fit. Engagement nails 44*b* are raised from a pair of opposing side surfaces of the fitting part 44*a* as shown in FIG. 5 so that the nails 44*b* may be engaged with the nails 25*e* extending from the bottom surface 25*c*. The connector piece 44 also has fitting holes 44*c* and 44*d* into which a fitting protrusion 32*a* of the supporting body 32 and a fitting protrusion 25*f* of the bottom surface 25*c* are force-fit. The connector pieces 44 are formed with female-side holding pieces 45 and 46 at the top ends. The holding pieces 45 and 46 are supported by the first post 27 and the second post 28, of the holding plate 29 side, respectively. That is, the connector piece 44 is positioned and supported by the fitting protrusions 32*a* and 25*f* and the posts 27 and 28. Further, the connector piece 44 is assembled with the plate 25 by the engagement between the engagement nail 25*e* and the engagement piece 44*b* so that it may not drop off from the plate 25.

As shown in FIGS. 2 and 4, the holding pieces 45 of the female terminal 43 which is at the ground side has a grounding part 45*a* integrally. The holding pieces 45 and 46 are soldered to ends 47*a* of the coils 47 of the choke coil 40 and to the connecting ends 42*a* of the capacitor 42.

As shown in FIG. 2, a pair of male terminals 48 as the first connecting terminals pass through the plate 25 and extend from the surface 25*a* of the plate 25 in a perpendicular direction at locations corresponding to the female terminals 43. The male terminals 48 and the female terminals 43 are positioned at the same positions on the top and bottom surfaces of the plate 25. Each male terminal 48 shown in FIG. 4 has a male-side holding piece 49 at its base end 48*a*. The holding piece 49 is supported by the first post 27 and the second post 28. The holding piece 49 is soldered to the other end 47*b* of the coil 47.

Figure 3:
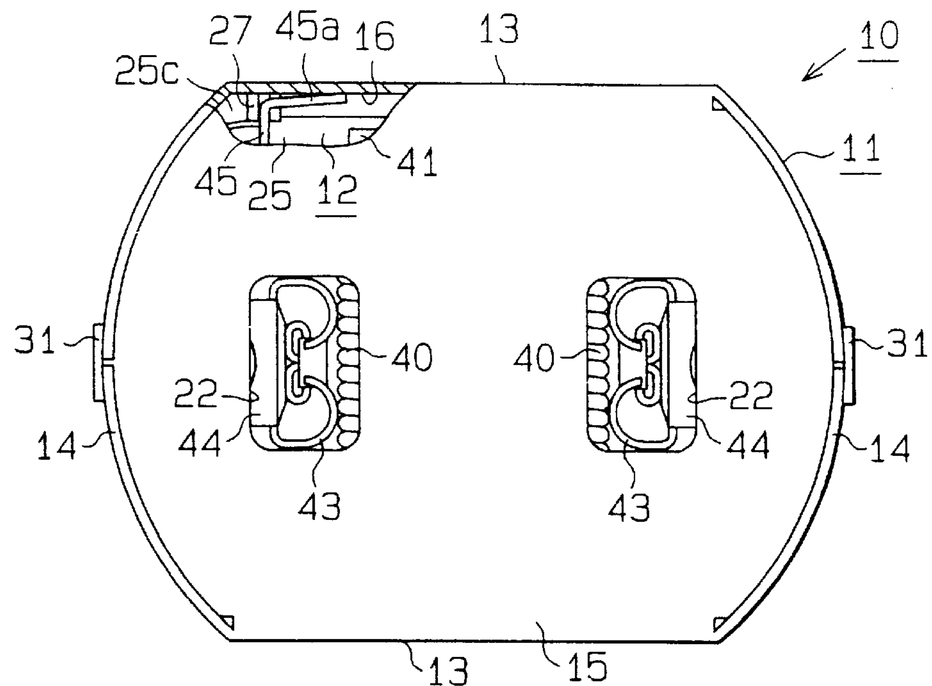
FIG. 3 is a bottom view of the electrical noise suppressing device shown in FIG. 1.

As shown in FIGS. 1 and 2, the engagement protrusion 31 is engaged in the engagement hole 18 of the casing 11, and the engagement protrusion 17 of the casing 11 is engaged in the engagement recess 26. Thus, the noise suppressor 12 is accommodated within the accommodating chamber 16. As shown in FIG. 3, the female terminal 43 is disposed at the position which corresponds to the through hole 22 provided in the bottom wall of the casing 11. Further, as shown in FIG. 4, the grounding piece 45*a* is resiliently coupled with the casing 11 while being force-contacted with the inside surface of the parallel wall 13 of the casing 11. The grounding piece 45*a* is formed to extend along the parallel side wall 13 of the casing 11.

Figure 7:
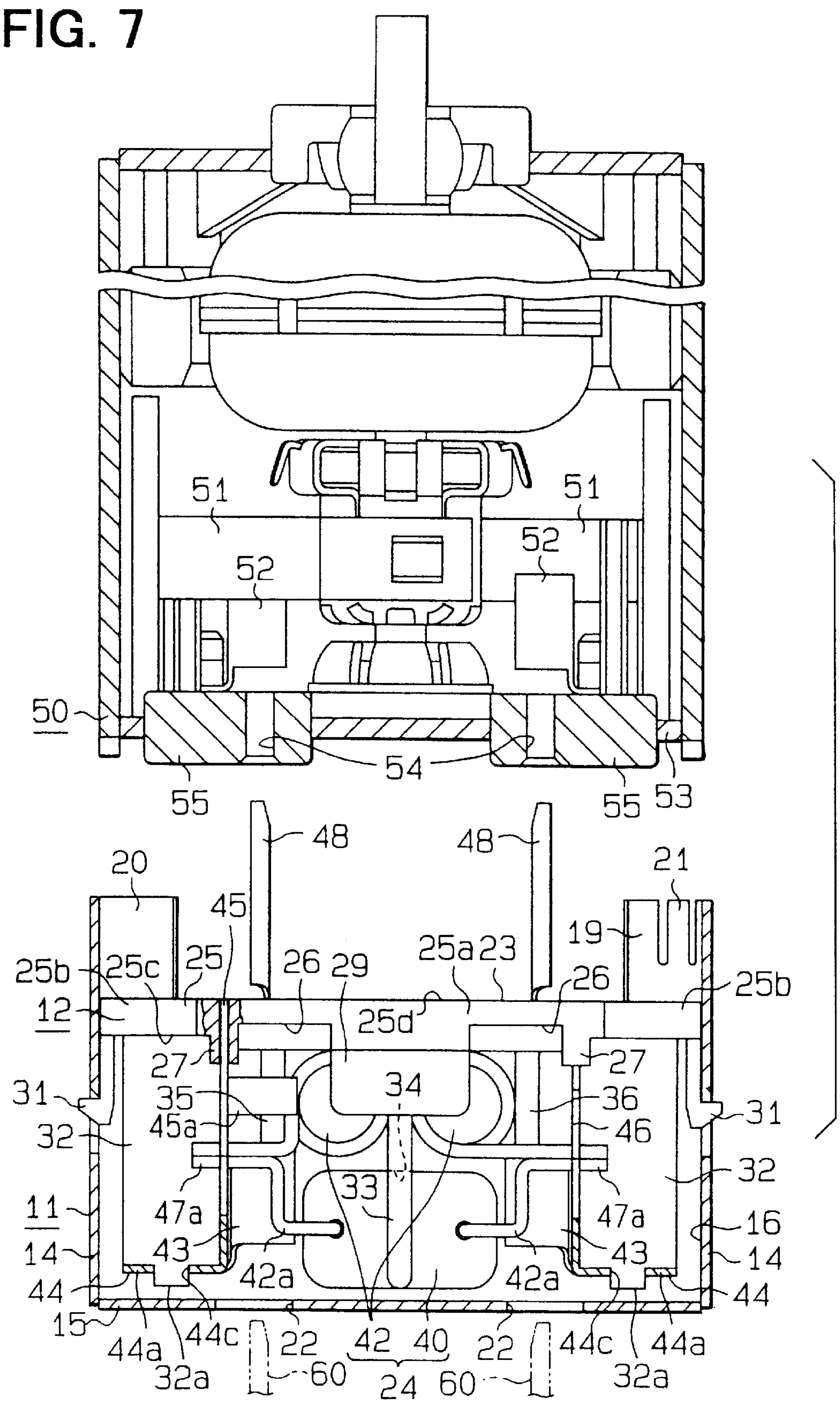
FIG. 7 is a sectional view showing a mode by which the electrical noise suppressing device is assembled to the motor.

Referring next to FIG. 7, a motor 50 has a pair of power supplying brushes 51 and a pair of motor-side female terminals 52 as motor-side connecting terminals connected to the brushes 51. The motor 50 also has an end frame plate 53 and a connector 55. The connector 55 is firmly fit in the end frame plate 53, and formed with male terminal insertion holes 54 at positions corresponding to the female terminals 52. Thus, the motor 50 does not include therein the noise suppressing device 10, so that the motor 50 may be assembled with the noise suppressing device 10 when necessary.

In assembling the noise suppressing device 10 with the motor 50, the male terminals 48 of the noise suppressing device 10 are passed through the insertion holes 54 of the motor 50 and inserted into the motor 50 to connect to the female terminals 52 of the motor 50. The guides 19 and 20 abut the outer peripheral surface of the motor 50. The tongues 21 of the guide 19 are bent inward to engage with engagement holes (not shown) formed in the outer peripheral part of the motor 50, thereby tightly holding the noise suppressing device 10 to the motor 50.

After assembling the noise suppressing device 10 to the motor 50, male terminals 60 of an external power source side are inserted into the noise suppressing device 10 through the holes 22 and connected to the female terminals 43. Thus, the motor 50 is supplied with the electric power from the external power source through the noise suppressing device 10. If noise suppression is not required, the male terminals 60 of the external power source are inserted into the holes 54 of the motor 50 and connected to the terminals 52 so that the motor 50 is supplied with the electric power without the noise suppressing device 10.

The above embodiment provides the following advantages.

The motor 50 need not have the noise suppressing component parts therein, but is enabled to have the noise suppressing function when required by attaching the noise suppressing device 10 thereto in a simple one-touch manner. The free space between the female terminals 43 is most efficiently used to accommodate the noise suppressor component parts 24 (choke coils 40 and capacitor 42). Thus, the noise suppressor device 10 can be sized small, and hence the assembly of the motor 50 and the noise suppressing device 10 can be maintained compact. The motor 50 may be used with or without the noise suppressing device 10, and hence need not be designed differently depending on whether the noise suppressing device is used or not.

The choke coils 40 and the capacitor 42 are connected directly to the terminals 43 and 48 (holding pieces 45, 46 and 49) which are parts of the electric power supply paths. As a result, the number of component parts can be reduced. The choke coils 40 are separated by the wall 33 and the capacitor 42 is fit in the recess 34 of the wall 33. As a result, the electrical insulation between the choke coils 40 and between the choke coils 40 and the capacitor 42 can be ensured.

The female terminal 43 (connecting piece 44) and the plate 25 have the engagement piece 44*b* and the engagement nail 25*e*, respectively, for engaging the terminal 43 (connecting piece 44) to the plate 25. As a result, the terminal 43 can be attached to the plate 25 with ease and prevented from dropping off from the plate 25.

The noise suppressing body 12 is surrounded by the conductive casing 11. This conductive casing 11 further enhances the noise suppressing effect owing to its shielding function.

The grounding piece 45*a* is resiliently coupled with the casing 11 and held in force-contact with the inside surface of the parallel side wall of the casing 11. As a result, one of the female terminals 43 can be easily connected to the casing 11 as the grounding terminal through the grounding piece 45*a*. As the grounding piece 45*a* can be shaped longitudinally, the grounding to the casing 11 can be ensured.

The above embodiment may be modified in various ways.

The noise suppressing component part 24 may be constructed with solely a single choke coil or a capacitor, or with other electronic component parts. The choke coils 40 and the capacitor 42 may be disposed between the male terminals 48. The choke coils 40 and the capacitor 42 may be oriented in any other directions. The choke coils 40 and the capacitor 42 may be connected to the terminals 43 and 48 (holding pieces 45, 46 and 49) by using additional conductive wires. Choke coils 40 and the capacitor 42 may be arranged without using the wall 33 and may be insulated by pasting an insulating resin among the components.

The female terminal 43 and the male terminal 48 may be positioned at different locations. The grounding piece 45*a* need not be integrally formed with the holding piece 45, but may be a separate member. The grounding piece 45*a* need not extend in parallel with the side wall 13 of the casing 1. The female terminal 43 and the plate 25 may be fixed by deforming the top ends of the fitting protrusions 25*f* and 32*a* by heat without using the engagement piece 44*b* and the engagement nail 25*e*.

The casing 11 may be made of any conductive materials (copper, aluminum, zinc or an alloy of these) other than iron, or may be non-conductive.

What is claimed is:

1. An electrical noise suppressing device for a motor having a pair of motor-side connecting terminals connectable to a pair of source-side connecting terminals of an electrical power source, the device comprising:

an insulating plate having a first side surface and a second side surface opposite the first surface;

a pair of first connecting terminals raised in parallel with each other from the first side surface of the insulating plate and connectable with the motor-side connecting terminals, the first connecting terminals defining a first space therebetween;

a pair of second connecting terminals raised in parallel with each other from the second side surface of the insulating plate and connectable with the source-side connecting terminals, the second connecting terminals defining a second space therebetween; and electrical component unit connected to at least one of the first connecting terminals in the first space and the second connecting terminals in the second space for suppressing electrical noise generated in the motor.

2. The electrical noise suppressing device as in claim 1, wherein:

the electrical component unit is elongated, and is parallel with the insulating plate and perpendicular to a direction in which the first connecting terminals and the second connecting terminals face each other.

3. The electrical noise suppressing device as in claim 2, wherein:

the electrical component unit is directly connected to the at least of the first connecting terminals and the second connecting terminals.

4. The electrical noise suppressing device as in claim 2, further comprising:

a separating wall having a recess, wherein the electrical component unit includes a pair of choke coils and a capacitor, the choke coils being disposed at both sides of the separating wall, and the capacitor being fit and held in the recess of the separating wall.

5. The electrical noise suppressing device as in claim 2, wherein:

the second connecting terminals and the insulating plate have respective engagement pieces for tightly engaging the second connecting terminals to the insulating plate.

6. The electrical noise suppressing device as in claim 2, further comprising:

a conductive casing surrounding the second connecting terminals and the electrical component unit.

7. The electrical noise suppressing device as in claim 1, wherein:

the first connecting terminals and the second connecting terminals are positioned at the same locations of the insulating plate to each other.

8. The electrical noise suppressing device as in claim 7, wherein:

the electrical component unit is elongated, and is parallel with the insulating plate and perpendicular to a direction in which the first connecting terminals and the second connecting terminals face each other.

9. The electrical noise suppressing device as in claim 8, wherein:

the electrical component unit is directly connected to the at least of the first connecting terminals and the second connecting terminals.

10. The electrical noise suppressing device as in claim 8, further comprising:

a separating wall having a recess, wherein the electrical component unit includes a pair of choke coils and a capacitor, the choke coils being disposed at both sides of the separating wall, and the capacitor being fit and held in the recess of the separating wall.

11. The electrical noise suppressing device as in claim 8, wherein:

the second connecting terminals and the insulating plate have respective engagement pieces for tightly engaging the second connecting terminals to the insulating plate.

12. The electrical noise suppressing device as in claim 8, further comprising:

a conductive casing surrounding the second connecting terminals and the electrical component unit.

13. The electrical noise suppressing device as in claim 1, further comprising:

a conductive casing surrounding the second connecting terminals and the electrical component unit.

14. An electrical noise suppressing device for a motor having a pair of motor-side connecting terminals connectable to a pair of source-side connecting terminals of an electrical power source, the device comprising:

a casing having a shape attachable to the motor at a side of the motor-side connecting terminals;

a pair of casing-side connecting terminals fixedly disposed in the casing and connectable with the motor-side connecting terminals and the source-side connecting terminals; and electrical components disposed in the casing and connected to the connecting terminals of the casing for suppressing electrical noise generated in the motor.

15. The electrical noise suppressing device as in claim 14, further comprising:

an insulating plate disposed in the casing and fixedly supporting the casing-side connecting terminals in a perpendicular direction thereto so that one end and another end of each of the casing-side connecting terminals are located outside and inside the casing, respectively, wherein the casing has a pair of through holes through which the source-side connecting terminals are connectable to the casing-side connecting terminals in the casing.

16. The electrical noise suppressing device as in claim 15, further comprising:

a separating wall held perpendicularly to the insulating plate at a position between the casing-side connecting terminals in the casing and having a recess therein, wherein the electrical components includes choke coils disposed at both sides of the separating wall and a capacitor fit in the recess of the separating wall, the choke coils and the capacitor being connected to the casing-side connecting terminals at a side of the another end.

17. The electrical noise suppressing device as in claim 16, wherein:

the choke coils and the capacitor are arranged in parallel with the insulating plate and perpendicularly to a direction in which the casing-side connecting terminals face each other.

* * * * *